(12) United States Patent  
Diallo et al.

(10) Patent No.: US 9,170,345 B2  
(45) Date of Patent: Oct. 27, 2015

(54) NEAR-OFFSET EXTRAPOLATION FOR FREE-SURFACE MULTIPLE ELIMINATION IN SHALLOW MARINE ENVIRONMENT

(75) Inventors: Mamadou S. Diallo, Houston, TX (US); Warren S. Ross, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 712 days.

(21) Appl. No.: 13/533,628

(22) Filed: Jun. 26, 2012

(65) Prior Publication Data

US 2013/0100771 A1   Apr. 25, 2013

Related U.S. Application Data

(60) Provisional application No. 61/549,061, filed on Oct. 19, 2011.

(51) Int. Cl.  
*G01V 1/36* (2006.01)

(52) U.S. Cl.  
CPC .......... *G01V 1/36* (2013.01); *G01V 2210/1423* (2013.01); *G01V 2210/244* (2013.01); *G01V 2210/56* (2013.01); *G01V 2210/57* (2013.01)

(58) Field of Classification Search  
CPC .............. G01V 1/36; G01V 2210/244; G01V 2210/057; G01V 2210/1423; G01V 2210/56  
See application file for complete search history.

(56) References Cited

U.S. PATENT DOCUMENTS

| | | | | |
|---|---|---|---|---|
| 6,094,620 | A * | 7/2000 | Gasparotto | G01V 1/36 702/14 |
| 6,735,527 | B1 * | 5/2004 | Levin | G01V 1/36 702/14 |
| 7,379,386 | B2 | 5/2008 | Muyzert et al. | |
| 7,564,740 | B2 | 7/2009 | Wood | |
| 7,584,057 | B2 | 9/2009 | Ozbek et al. | |
| 2004/0220743 | A1 * | 11/2004 | Sahai | G01V 1/303 702/14 |
| 2008/0162051 | A1 * | 7/2008 | Ikelle | G01V 1/30 702/14 |
| 2009/0288823 | A1 * | 11/2009 | Baumstein | G01V 1/282 166/250.16 |
| 2010/0002539 | A1 | 1/2010 | Kragh et al. | |
| 2011/0044127 | A1 | 2/2011 | Kostov et al. | |
| 2012/0073824 | A1 * | 3/2012 | Routh | G01V 1/28 166/369 |

OTHER PUBLICATIONS

Daubechies, J. et al. (2004), "An Iterative thresholding algorithm for linear inverse problems with a sparsity constraint," *Commun. Pure Appl. Math*, pp. LVH:1413-1457.

(Continued)

*Primary Examiner* — Ari M Diacou  
(74) *Attorney, Agent, or Firm* — ExxonMobil Upstream Research Company, Law Dept.

(57) ABSTRACT

The invention is a method for extrapolating missing near-offset seismic data (101) so that the data may be used, for example, in SRME or another multiple-reflection elimination method. The invention uses the reciprocity principle (102) to relate two seismic states (acoustic or elastic) that can occur in a time-invariant, bounded domain in space. One of these states represents the physical experiment for the acquisition of the actual seismic data where near-offset traces are missing, and the other state represents a synthetic experiment with no missing near offset traces, computer-generated on a much simpler earth model. The reciprocity relationship used to relate these two states is iteratively inverted for the missing near-offset traces (103), preferably using only part of the synthetic data (102) so as to reduce inversion artifacts. The reference model acts as a constraint on the near-offset extrapolation.

18 Claims, 10 Drawing Sheets (56) References Cited

OTHER PUBLICATIONS

Herrmann, F.J. et al. (2008), "Non-parametric seismic data recovery with curvelet frames," Seismic Laboratory for Imaging & Modeling, University of British Columbia, pp. 31-35.

Jensen, F.B. et al. (1994), "Computational Ocean Acoustic," American Institute of Physics, New York, pp. 343-412.

Ramirez, C.A. et al. (2009), "Green's theorem as a comprehensive framework for data reconstruction, regularization, wavefield separation, seismic interferometry, and wavelet estimation: A tutorial," Geophysics 74(6), pp. W35-W62.

Schuster, G.T. (200), "Seismic Interferometry," Cambridge University Press, pp. 32-33.

Verschuur, D.J. et al. (1992), "Adaptive surface-related elimination," Geophysics 57, pp. 1166-1177.

Wapenaar, K. et al. (2010), "Tutorial on seismic interferometry: Part 2—Underlying theory and new advances," Geophysics 75(5), pp. 75A211-75A227.

Weglein, A.B. et al. (2003), "Inverse scattering series and seismic exploration," Inverse Problems 19, pp. R27-R83.

Zheng, Y. (2010), "Retrieving the exact Green's function by wavefield crosscorrelation," J. Acoust. Soc. Am. 123(3), pp. EL93-EL98.

\* cited by examiner

NEAR-OFFSET EXTRAPOLATION FOR FREE-SURFACE MULTIPLE ELIMINATION IN SHALLOW MARINE ENVIRONMENT

CROSS-REFERENCE TO RELATED APPLICATION

This application claims the benefit of U.S. Provisional Patent Application 61/549,061, filed Oct. 19, 2011, entitled NEAR-OFFSET EXTRAPOLATION FOR FREE-SURFACE MULTIPLE ELIMINATION IN SHALLOW MARINE ENVIRONMENT, the entirety of which is incorporated by reference herein.

FIELD OF THE INVENTION

This invention relates generally to the field of seismic prospecting and, more particularly to seismic data processing. Specifically, the invention is a method for eliminating surface-related multiple reflections from seismic data obtained in a shallow marine environment.

BACKGROUND OF THE INVENTION

In seismic exploration, energy that bounces back into the subsurface from interfaces such air/water (in the marine environment) or air/land (in land seismic) generate seismic arrivals called free-surface multiples. These arrivals are in general undesirable seismic events because they can mislead the interpretation of the data to properly locate subsurface geological structures with potential hydrocarbon accumulation. Removal of free-surface multiples from seismic reflection data is an important and challenging problem in seismic data processing. General methods of dealing with the mitigation of surface-related multiples include methods based on the feedback model known as surface-related multiple elimination (SRME) (Verschuur et al., 1992) and the inverse-scattering series approach (Weglein et al., 2003). In principle, these physics-based methods are capable of predicting and eliminating free-surface multiples without any prior knowledge about the subsurface velocity model. However, rigorous application of these methods requires that data are available at all offsets (distance between source and receiver) and well sampled in space and time.

In general it is very difficult to meet the data requirement for a rigorous application of the free-surface multiple elimination methods mentioned above. This is especially the case in marine seismic acquisition where near-offset gap (distance between source and the first receiver on the streamer cable) and crossline receiver spacing can be very large in comparison to the receiver spacing in the inline direction. In some situations, such as deep marine environment, near-offset missing traces can be extrapolated fairly well using kinematics-based methods (such as Radon extrapolation after application of normal moveout correction). When such near-offset extrapolation is successful, it is possible to apply SRME and obtain a good estimate of the free-surface multiple contributions to the data. Subsequently, adequate optimization approaches can be used to effectively subtract the free-surface multiples from the dataset. However in an environment where the depth from the free-surface to the first strong reflector is small, such as in a shallow marine environment where the water bottom depth is less than 100 m, extrapolation to the near offsets by methods suitable for deep water does not work. Hence, application of SRME or the inverse-scattering based methods becomes ineffective for free-surface multiples elimination. Under these circumstances, successful application of these free-surface multiple removal methods requires an adequate extrapolation of the missing near-offset traces. Patent Application US 2011/0044127 teaches a method of removing free-surface effects without the need of near-offset extrapolation, but requires more than one receiver cable and a seismic source at least 100 m in the front end of the spread. These constraints impose additional acquisition effort not required in a standard marine survey. Patent Application US 2011/00002539 teaches a method of zero offset seismic trace construction, but requires the deployment of additional receivers to record of the near-field acoustic source and does not specifically address the issue of free-surface multiples removal. What is needed therefore is a method that uses data from a standard marine survey and does not require extra acquisition effort (deployment of multiple cables or near-field receivers).

SUMMARY OF THE INVENTION

The invention is generally related to the extrapolation of missing near-offset traces to enable an effective mitigation of free-surface multiples with methods such as SRME and the inverse scattering series based approach. The invention uses the concept of a reciprocity relation of convolution type, which requires a corresponding reference model similar, but not exactly the same as the actual model that generated the seismic data. A reference model acts as a constraint on the near-offset extrapolation, and hence the extrapolation is potentially more successful than the unconstrained methods referenced above.

In one embodiment, the invention is a computer-implemented method for estimating missing near-offset traces in measured seismic data, comprising relating all or part of synthetic seismic data, generated using a reference subsurface model, to the measured seismic data by a reciprocity relationship, and then iteratively inverting the reciprocity relationship for the missing near-offset traces using a programmed computer.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
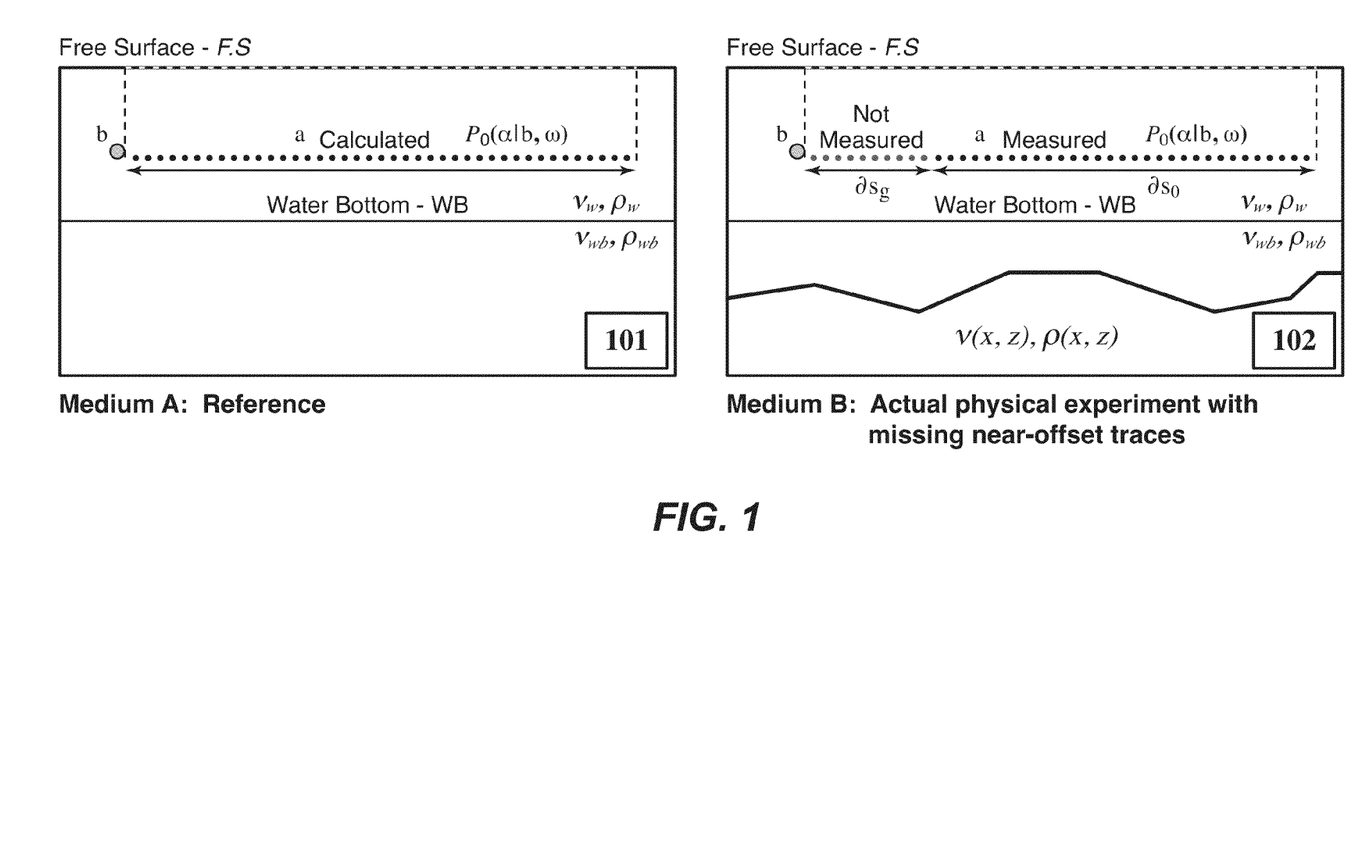
FIG. 1 illustrates the two states needed for the application of the extrapolation method of the present invention.

The invention is based on the application of the reciprocity principle to relate two seismic states (acoustic or elastic) that can occur in a time-invariant, bounded domain in space. One of these states represents the physical experiment for the acquisition of the actual seismic data where near-offset traces are missing, and the other state represents a synthetic experiment without missing near offset traces, generated on a much simpler earth model. The earth model for the synthetic experiment may consist of a water layer over a half-space (such as the Pekeris Wave Guide) as reported in Jensen et al., (1994). FIG. 1 shows a simplified illustration of the data acquisition in the two states considered. The acoustic properties of the synthetic earth model 101 are assumed to be similar to those of the physical experiment 102 for the water and immediate water bottom. The method requires knowledge of the acoustic properties of the water layer, its thickness, along with the acoustic properties of the water bottom, in order to model the Pekeris waveguide. No other information is required from the heterogeneous earth where the actual data are acquired. The pressure field due to a source at b and receiver at a for a frequency $\omega$ in both states can be related through the reciprocity relation of the convolution type that can be derived using Green's theorem (Wapenaar and Fokkema, 2006; Ramirez and Weglein 2009; Schuster 2009):

$$P(a, b, \omega) - P_0(a, b, \omega) = \int_{\partial s} [P_o(x, b, \omega)\nabla P(x, b, \omega) - P(x, b, \omega)\nabla P_0(x, b, \omega)] \cdot \vec{n} ds \quad (1)$$

with $\partial S = \partial S_{known} + \partial S_{gap} + F \cdot S = \partial S_0 + \partial S_{miss\_offsets} + F \cdot S = \partial S_0 + \partial S_g + F \cdot S$ This surface integral is performed along the surface defined by (see FIG. 1) the segment of the acquisition cable where data are recorded ($\partial s_0$), the segment where near-offset data are missing ($\partial s_g$), the free surface (F·S) and the vertical walls denoted by the dashed vertical lines. n is the outward normal to the surface $\partial S$. The contribution of the free surface boundary to this integral is zero because both $P_0(a,b,\omega)$ and $P(a,b,\omega)$ equal to zero at that boundary. Contributions of the two vertical walls are neglected by invocation of the outgoing radiation boundary condition. $P_0(a,b,\omega)$ is known for the entire acquisition cable (i.e. integration surfaces $\partial s_g$ and $\partial s_0$). Using a dual-sensor cable for the physical experiment offers a means of computing the vertical component of pressure gradient, $$\nabla P \cdot \vec{n} = \frac{\partial P}{\partial z} = i\rho\omega v_z,$$

where $v_z$ is the vertical component of the particle velocity. For the synthetic data, the pressure gradient can be computed in a similar manner using the modeled pressure and vertical particle velocity fields.

Under special circumstances, applying the boundary integral method to the exterior domain of $\partial s$, P and $$\nabla P \cdot \vec{n} = \frac{\partial P}{\partial z}$$

can be determined from each other on a unique way (Williams, 1999; Zheng, 2010). In such a case, the pressure gradient can be computed as $\nabla P \cdot \vec{n} = CP$, where C is a square, invertible matrix which depends only on known information from the reference medium, and CP means multiplication of the matrix by a column matrix of pressure values at different positions. Such a relation can be used to estimate the vertical component of the gradient $$\nabla P \cdot \vec{n} = \frac{\partial P}{\partial z}$$

in the segment of the streamer cable where P is known by multiplying it with a scalar factor. Experience has shown that this way of estimating $$\nabla P \cdot \vec{n} = \frac{\partial P}{\partial z}$$

in the segment of the streamer where P is known yields better extrapolation results. In the near-offset gap, there are two unknowns, the pressure P and the vertical component of its gradient $$\nabla P \cdot \vec{n} = \frac{\partial P}{\partial z}.$$

Splitting the integral equation into known and unknown parts of the pressure field and its gradient over the measurement cable results in an over-determined system of equations:

$$\begin{bmatrix} K_{l1} & \left(\frac{\partial K}{\partial z}\right)_{l1} & \cdots & \cdots & K_{ln} & \left(\frac{\partial K}{\partial z}\right)_{ln} \\ \vdots & & & & \vdots \\ \vdots & & & & \vdots \\ K_{j1} & \left(\frac{\partial K}{\partial z}\right)_{j1} & & & K_{jn} & \left(\frac{\partial K}{\partial z}\right)_{jn} \end{bmatrix} \begin{bmatrix} P_1 \\ \left(\frac{\partial P}{\partial z}\right)_1 \\ \vdots \\ P_n \\ \left(\frac{\partial P}{\partial z}\right)_n \end{bmatrix} = \begin{bmatrix} B_l \\ B_{l+1} \\ \vdots \\ \vdots \\ B_{j-1} \\ B_j \end{bmatrix} \quad (2)$$

where j−l+1, is the number of receiver where both the pressure and particle velocity are measured and 2n is the number of unknowns in the gap (i.e., the pressure and the component of its gradient along the vertical direction z). $K_{ij}$ and $$\left(\frac{\partial K}{\partial z}\right)_{ij}$$

represent the pressure and the vertical component of its gradient for the synthetic acoustic state. $P_i$ and $$\left(\frac{\partial P}{\partial z}\right)_i$$

represent the unknowns pressure fields and pressure field gradients in the near-offset gap. The column vector B represents a collection of all known parts from equation (1).
This surface integral is performed along the surface defined by the segment of the acquisition cable where data are recorded ($\partial s_0$).

A compact form of equation (2) is $KP=B.$

A direct inversion of this system to infer P using a least-squares approach yields an inadequate solution to the problem, due to the low effective rank of this linear system. In order to obtain an adequate solution, we introduce an iterative solution approach using any of several iterative methods. Experience has shown the Landweber iteration (Landweber, 1951 2004):

$$P_{k+1}=P_k+h(K^TB-K^TKP_k) \quad (3)$$

where the parameter h is determined as a fraction of the inverse of the maximum eigenvalue $\lambda_{max}$ of $K^TK$ ($h=\alpha/\lambda_{max}$, $0<\alpha<1$), to be very successful at generating an adequate max solution. In addition to using this iteration scheme, it has also proved preferable to select only a single event of the reverberation series of the modeled data. The selected event is most often either a primary or a multiple. To select the event, it is windowed both in time and space around the zone of the near-offset gap. This use of only a selected part of the reverberation series is counter to what strict application of the reciprocity relation would counsel, in that the theory is derived assuming the entire reverberation series (the entire Green's function of the reference model) is used. However, we have found it advantageous to depart from a strict application of the theory in order to control the generation of artifacts in the solution. A first-order or higher-order multiple is preferably selected when the water is very shallow (<100 m). For intermediate to large water bottom depth (100-200 m), the primary event from the reverberation series is preferably selected. Selecting single events from the multiples in this way removes unwanted artifacts. Results of the iterative extrapolation scheme may be subjected to a dip angle filter to remove coherent events with velocities less than that of the water layer. This further stabilizes the inversion.

Figure 10:
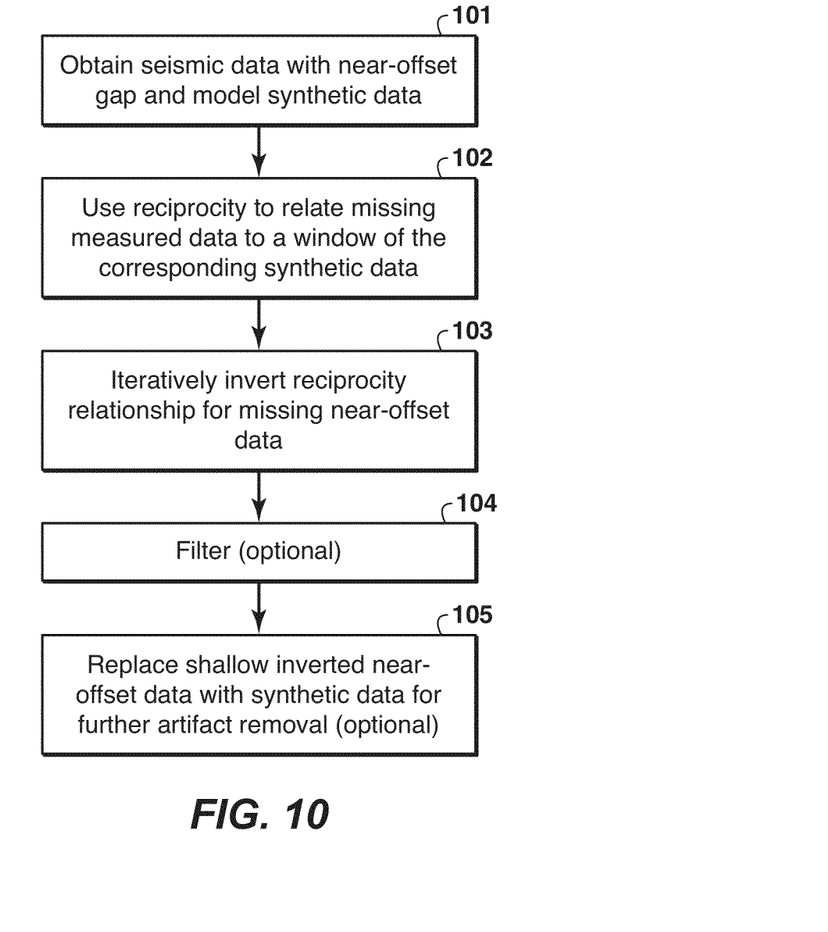
FIG. 10 is a flowchart showing basic steps in one embodiment of the present inventive method.

Basic steps for performing one embodiment of the present inventive method for near-offset data extrapolation in a marine environment are summarized in the flowchart of FIG. 10. In step 101, measured seismic data acquired with a gap at certain offsets are obtained, and corresponding synthetic data are simulated, using a reference velocity model, with no gaps. At step 102, the recorded seismic data, after muting the direct arrivals, are related by reciprocity to the parts of the data predicted from the reference model. The reciprocity relation may be, for example, equations (1) and (2). A single event in the synthetic data (primary or multiple) may be windowed in time and space within the near offset gap. The windowed event may then be related to the recorded data using the reciprocity relation, which may be of the convolution type.

At step 103, the reciprocity relation is iteratively inverted to infer the missing near-offset data. The over-determined system of equations resulting from the reciprocity relation may be solved using, for example, the Landweber iteration method to obtain the initial extrapolated data. The solution may be constrained at each iteration by limiting the number of eigenvalues that contribute to the solution.

At step 104, the near-offset data may optionally be filtered to remove artifacts. For example, dip filtering may be used on the extrapolated near-offset data to remove events with velocities less than those of the water layer if necessary.

At step 105, further artifact removal may optionally be performed by pure replacement of the shallow part of the predicted near-offset data (from the iteratively-solved reciprocity relation) by the near-offset data predicted from the reference model alone. The maximum time of replacement should preferably be above the estimated zero offset arrival time of the first reflector below the water bottom.

EXAMPLES

Figure 2A:
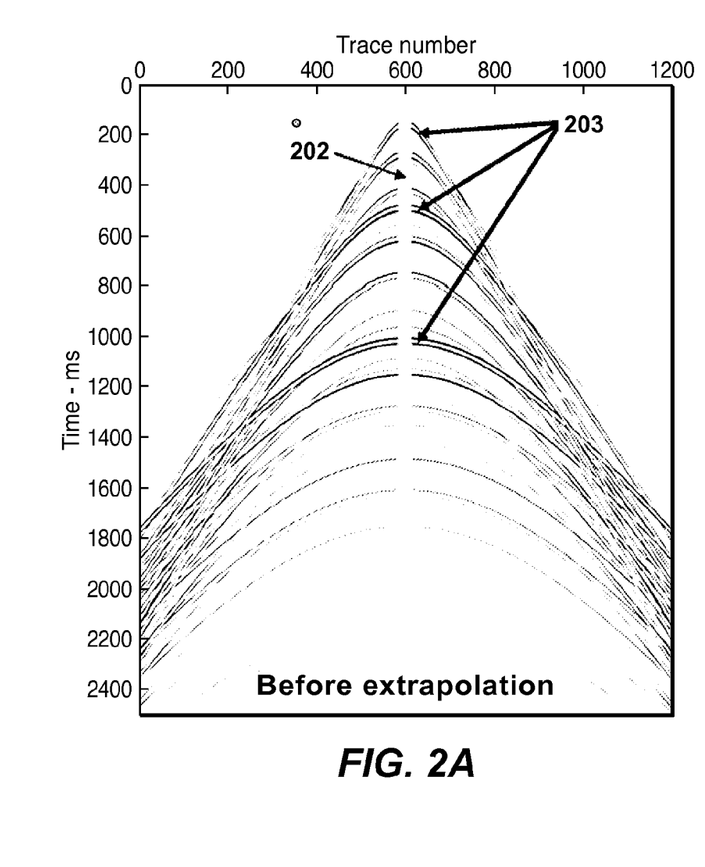
FIG. 2A shows a shot gather with a missing near-offset trace.
Figure 2B:
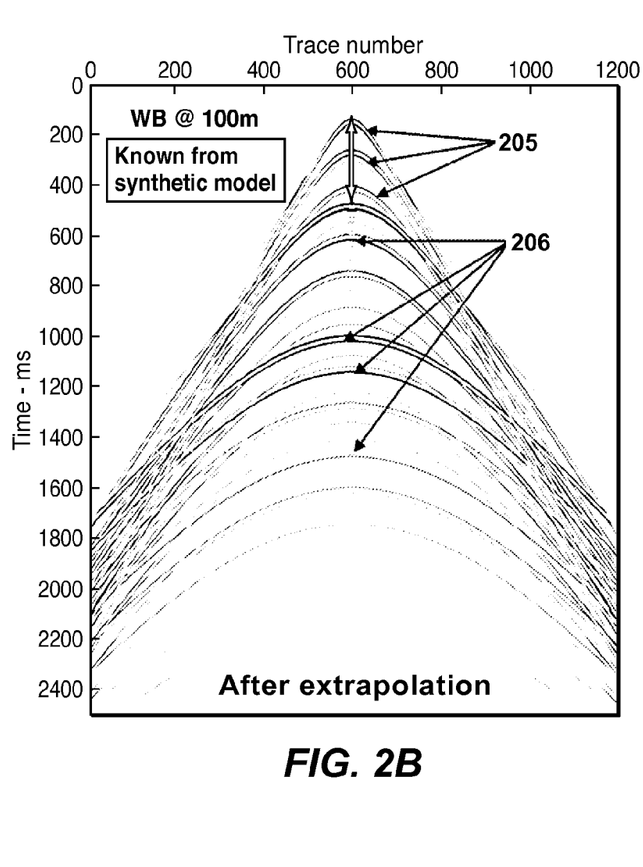
FIG. 2B shows the same shot gather with the missing trace extrapolated by the present inventive method.

FIG. 2B, shows results of application of the present inventive method to reconstruct missing near-offset traces. After extrapolation, SRME is applied to the data before and after extrapolation to validate the effectiveness of the method. The examples illustrate a marine environment, with a shallow water bottom at 100 m consisting of three layers over a half-space.

Figure 3A:
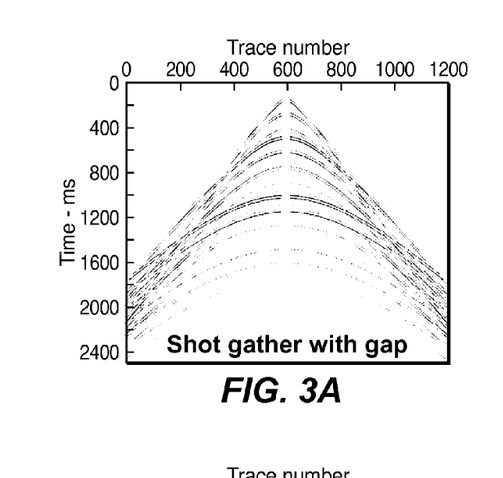
FIGS. 3A-3D shows the multiple-reflection contribution to be shot gather before and after extrapolation by the present inventive method.
Figure 3B:
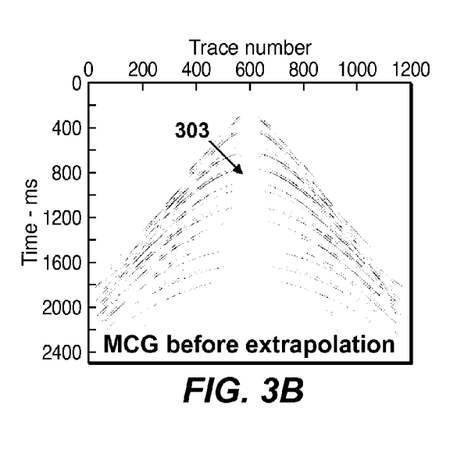
Figure 3C:
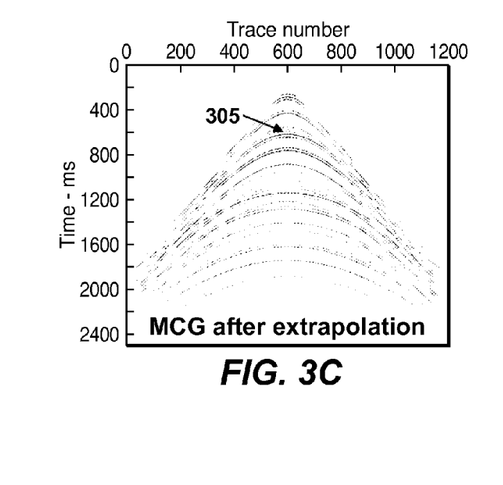
Figure 3D:
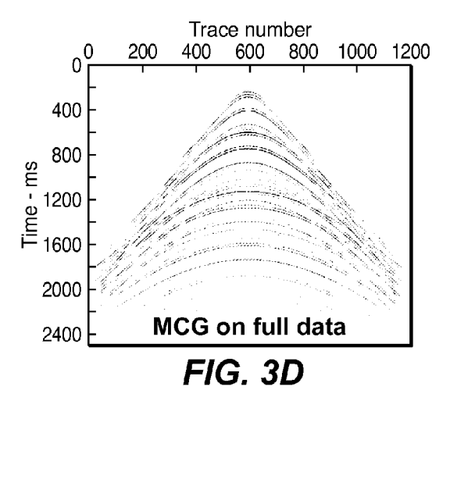

FIG. 2A shows the shot gather with the missing near-offset traces. The missing near-offset gap 202 is 150 m. FIG. 2B shows the shot after extrapolation of the missing traces. In these drawings, 203 are the primary reflection events that one wants to recover after multiple elimination. Pure water layer reverberations are indicated in FIG. 2B by 205. These are not extrapolated, but rather are taken from the reference model simulation. FIG. 2B also shows the extrapolated events 206 in the gap. To check the adequacy of the extrapolation, the multiple contribution gathers ("MCG") shown in FIGS. 3B, 3C and 3D were produced by a series of auto-convolutions of the data using, respectively, the shot gather with missing near-offsets shown in FIG. 3A, the shot gather after extrapolation by the present inventive method, and the shot gather without missing near-offsets. The full data gather used to produce FIG. 3D would not exist in a real survey, but was produced for this synthetic example for comparison. The results may be compared. In FIG. 3B, it can be observed that because of the missing traces, multiples are not well predicted within and around the near-offset gap 303, where the multiple events show discontinuities and low amplitudes. As a consequence, subtraction of these predicted multiples from the shot gather with missing near-offsets will result in inadequate surface-related multiples elimination. FIGS. 3C and 3D show the predicted surface-related multiples using the data after extrapolation (the gather shown in FIG. 2B) and the data without missing near-offsets, respectively. The multiple prediction after extrapolation compares very well with that from the shot gather without missing near-offsets both in terms of amplitude and kinematics.

Figure 4A:
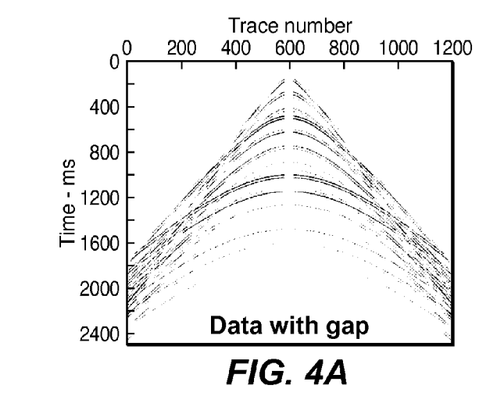
FIGS. 4A-4D shows the results of application of SRME to the shot gather before extrapolation and to the shot gather after extrapolation.
Figure 4B:
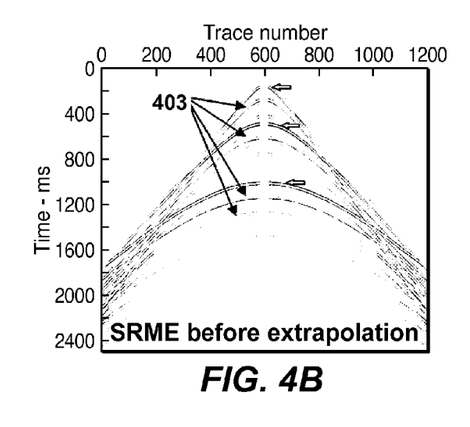
Figure 4C:
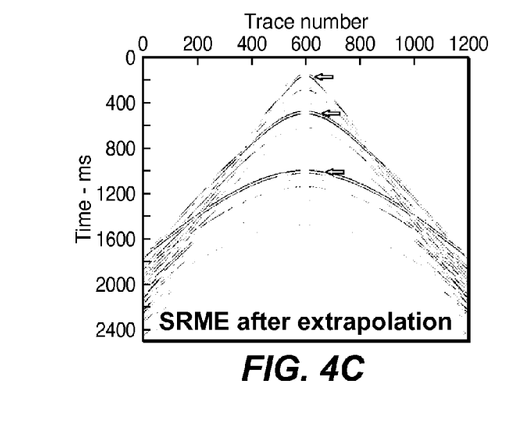
Figure 4D:
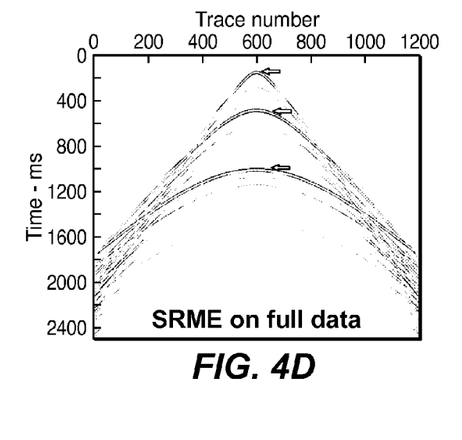

FIGS. 4A-4D show the result of SRME application. (FIGS. 2A, 3A and 4A are identical.) FIG. 4B shows the result of SRME application on the shot gather from FIG. 4A, with missing near-offsets. It can be seen that residual multiple events 403 are not properly mitigated. The white arrows show the primaries in the data with gap (FIG. 4B), after extrapolation (FIG. 4C), and the data without missing near-offsets (FIG. 4D). FIG. 4C shows the results of SRME application on the extrapolated shot gather. Most of the residual reflection events 403 have been attenuated. FIG. 4D shows results of SRME application on a shot gather without missing near offsets for comparison. In both FIGS. 4C and 4D, the desired primary reflection events (white arrows) can be more easily identified because the multiple reflection arrivals 403 have been significantly attenuated.

Figure 5A:
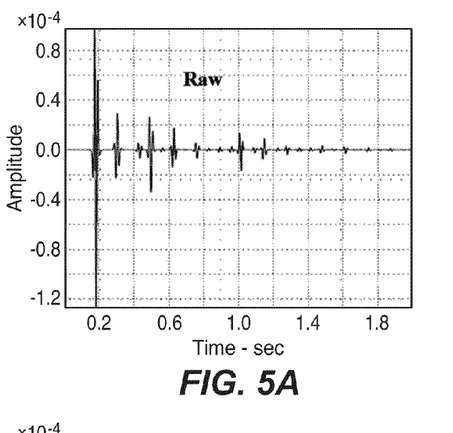
FIGS. 5A-5D shows the comparison of FIGS. 4A-4D for a single trace from the shot gather.
Figures 5B, 5D:
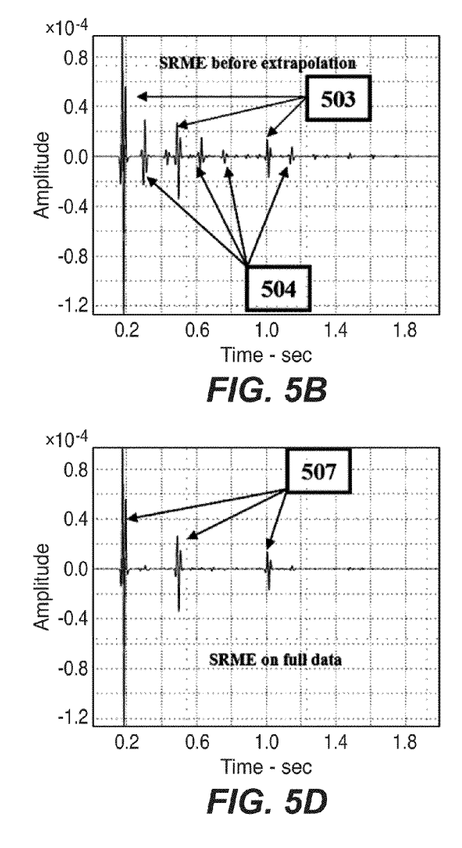
Figure 5C:
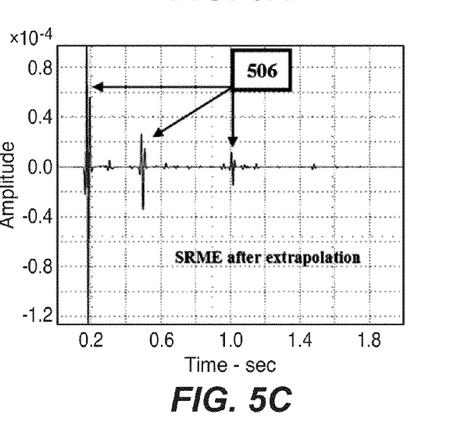

FIGS. 5A-5D show a specific trace (number 626) from FIGS. 4A-4D, respectively. FIG. 5A is the trace with primary and multiple reflection events. FIG. 5B shows the same trace after application of SRME on the shot gather with missing near-offsets. 503 are the desired primary reflections, and 504 are the multiple reflection events that are wanted to be eliminated but which are still strong. Applying SRME on the extrapolated data significantly reduces the multiple arrival contribution as shown in FIG. 5C, where the desired primaries are 506. Multiple elimination in FIG. 5C is comparable to the SRME results from the shot gather without missing near-offset shown in FIG. 5D.

Figure 6A:
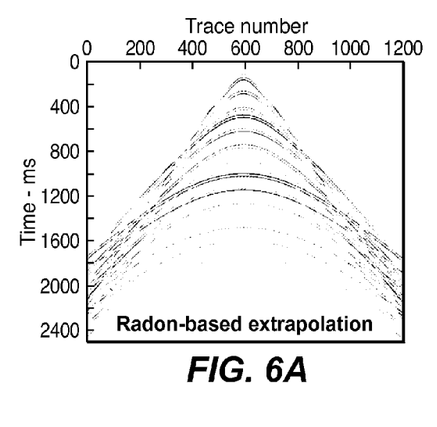
FIGS. 6A-6D compare extrapolation based on the present inventive method to extrapolation based on the traditional Radon method, for a smaller gap of missing traces and for a larger gap of missing traces.
Figure 6B:
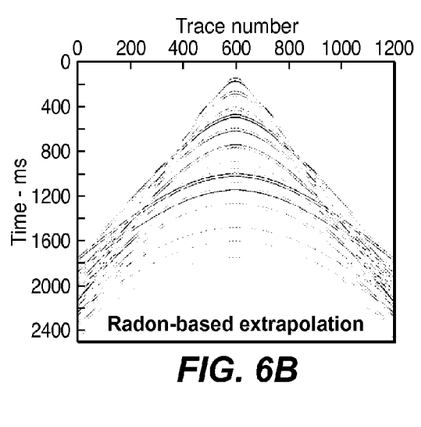
Figure 6C:
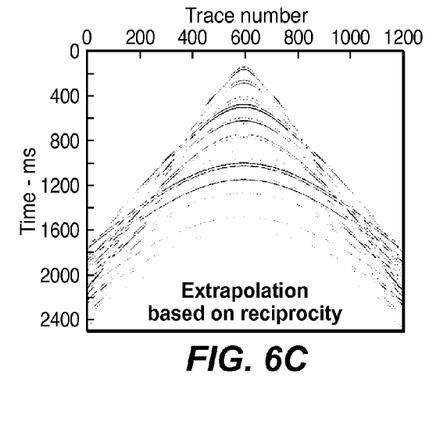
Figure 6D:
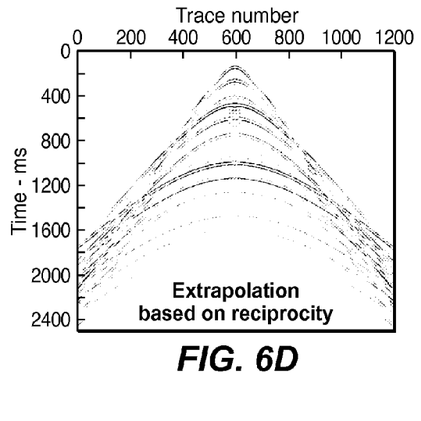

FIGS. 6A-6D show results of extrapolation using the present method and the Radon-based approach. FIGS. 6A and 6B show the extrapolation results using a traditional extrapolation method (Radon-based method) for a gap in the near-offset of 31 and 51 traces respectively. FIGS. 6C and 6D show the extrapolation results using the present invention's reciprocity based method for the same near-offset gaps of 31 and 51 traces, respectively. With the small near-offset gap (31 missing traces) the traditional extrapolation and the present invention show similar results. With the wider near-offset gap (51 missing traces), the present invention performs better. This may be seen more clearly looking at a single trace in FIGS. 9B and 9D where residuals of multiple arrivals are much more prominent in the trace from traditional method (9B).

Figure 7A:
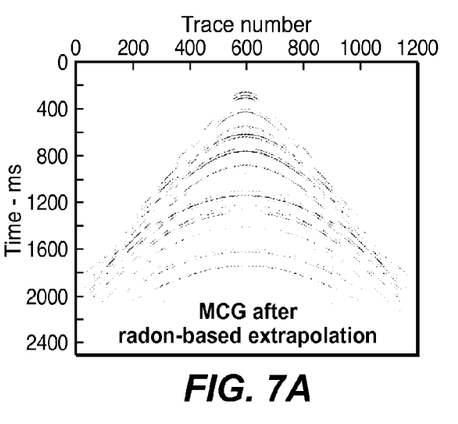
FIGS. 7A-7D repeat the comparison of FIGS. 6A-6D, now looking at the multiple-reflection contribution.
Figure 7B:
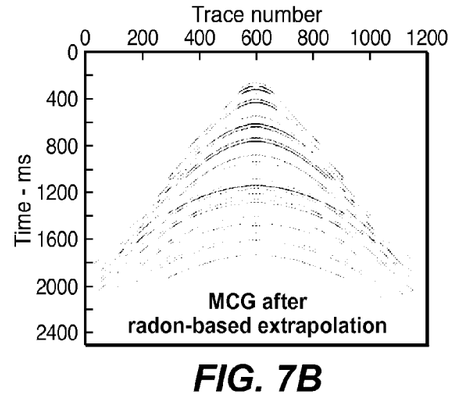
Figure 7C:
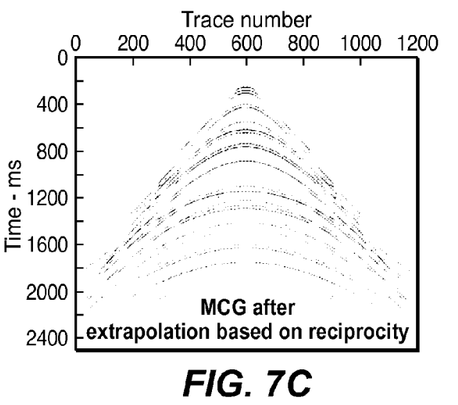
Figure 7D:
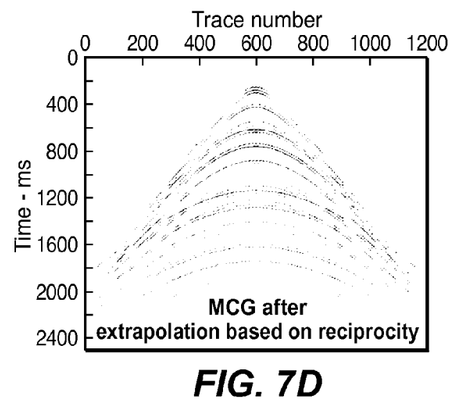

FIGS. 7A-7D, show multiple contribution gathers generated using the extrapolated data from FIGS. 6A-6D. It may be noted that the predicted multiples in FIGS. 7A and 7C, where extrapolation is performed in a narrow gap (31 missing traces), are very similar. However, in FIGS. 7B and 7D, where the extent of extrapolated gap is wider (51 traces), amplitude differences can now be observed. In FIG. 7B, amplitudes of predicted multiples in the near-offset range are relatively high compared to those in FIG. 7D.

Figure 8A:
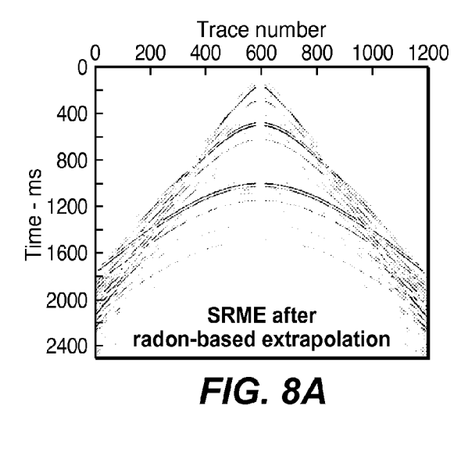
FIGS. 8A-8D look at the results of FIGS. 6A-6D after application of SRME.
Figure 8B:
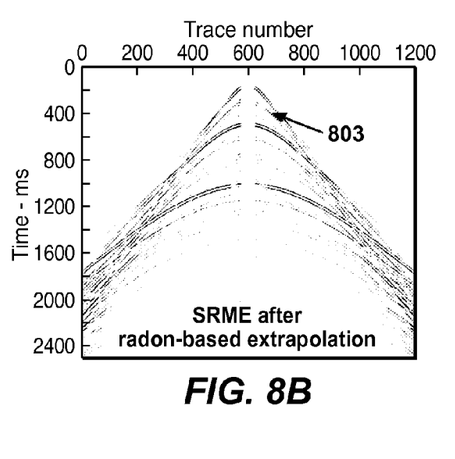
Figure 8C:
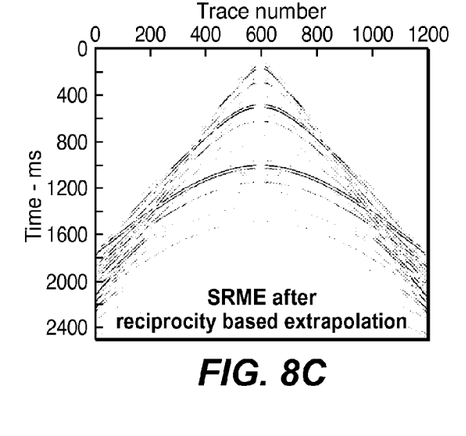
Figure 8D:
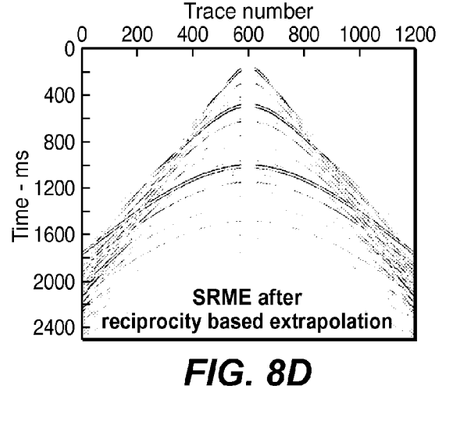
Figure 9A:
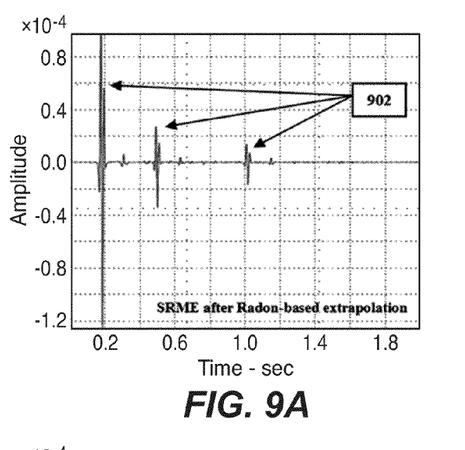
FIGS. 9A-9D show the comparison of FIGS. 8A-8D for a single trace from the shot gather.
Figure 9B:
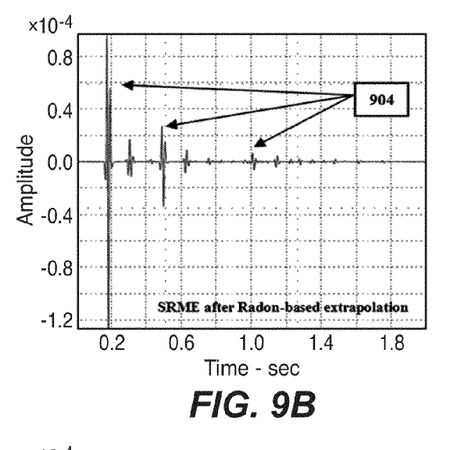
Figure 9C:
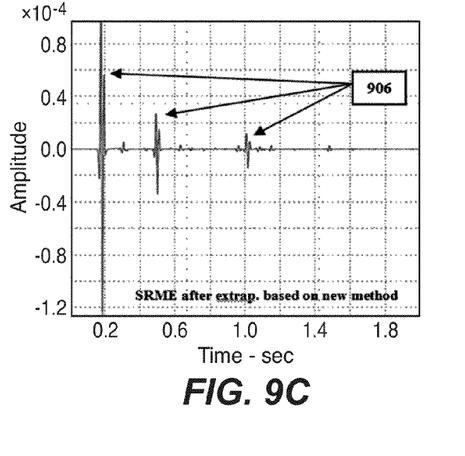
Figure 9D:
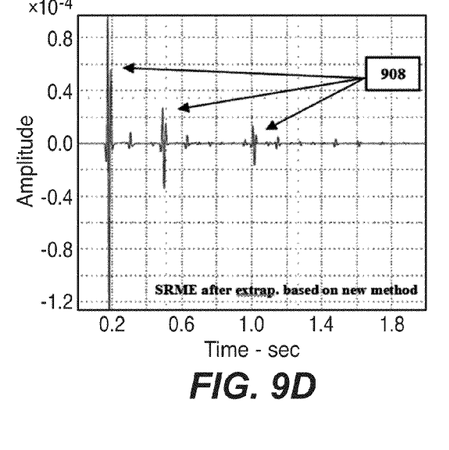

FIGS. 8A-8D show results of SRME application on the extrapolated gathers of FIGS. 6A-6D. FIGS. 8A and 8C, where the extent of the near-offset gap was 31 traces, show comparable performances. However, for a larger near-offset gap (51 traces), as shown in FIGS. 8B and 8D, the performances of the traditional Radon-based method and the reciprocity-based method of the present invention are different. 803 indicates a residual of a multiple-reflection event and a deeper primary reflection event with reduced amplitude. Such a strong residual of a multiple-reflection event together with damage to the deeper primary event are not to be observed in FIG. 8D, where SRME was applied after extrapolation based on the present invention's reciprocity-based method. FIGS. 9A-9D look at a particular trace, No. 626, from the data in FIGS. 8A-8D. 902, 904, 906 and 908 are the primary reflection arrivals. FIG. 9B shows the strong residual multiple arrivals and reduced amplitude of a deeper primary event (the primary at 1.0 s) compared to the same events in FIG. 9D.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented.

REFERENCES

1. Jensen, Finn B., Kuperman, William A., Porter Michel B. & Schmidt Henrik, "*Computational Ocean Acoustic,*" American Institute of Physics, New York, 343-412, (1994).
2. Landweber, L., 1951, "An iterative formula for fredholm integral equations of the first kind," *Am. J. Math,* 73, 615-624.
3. Kostov, C., Musil M., Robertsson J., and Kragh E., "Removing free-surface related effects from seismic data acquired in a towed survey, US Patent Application Publication No. US2011-0044127.
4. Kragh J. E., Robertsson J., Johan O. A., Muyzert E. J., and Ksotov C., "Zero offset seismic trace construction," US Patent Application Publication No. US2010-00002539.
5. Ramirez C. A. and Weglein A. B., "Green's theorem as a comprehensive framework for data reconstruction, regularization, wavefield separation, seismic interferometry, and wavelet estimation," A tutorial, *Geophysics* 74, W35-W62, (2009)
6. Schuster G. T. 2009, "Seismic Interferometry," Cambridge University Press, 32-33.
7. Verschuur, D. J., Berkout, A. J. And Wapenaar C. P. A., "Adaptive surface-related elimination," *Geophysics* 57, 1166-1177, (1992).
8. Weglein A. B., Fernanda V Araujo, P. M. Carvalho, R. H Stolt, K. H. Matson, R. T. Coates, D. Corrigan, D. J. Foster, S. A. Shaw and H. Zhang, "Inverse scattering series and seismic exploration," *Inverse Problems* 19, R27-83, (2003.)
9. Zheng, Y., "Retrieving the exact Green's function by wavefield cross-correlation," *J. Acoust. Soc. Am.* 127(3), EL93-EL98, (2010).

The invention claimed is:

1. A computer-implemented method for estimating missing near-offset traces in measured seismic data, comprising relating all or part of synthetic seismic data, generated using a reference subsurface model, to the measured seismic data by a reciprocity relationship, and then iteratively inverting the reciprocity relationship for the missing near-offset traces using a programmed computer, followed by using the estimated missing near-offset traces to augment the measured seismic data, then applying a technique for removal of multiple reflections, then interpreting the seismic data with multiple reflections removed for indications of accumulations of hydrocarbons, and in the event of such an indication at a location, drilling a well at the location and producing hydrocarbons.

2. The method of claim 1, wherein only a part of the synthetic seismic data are related to the measured seismic data by the reciprocity relationship, said part being determined by a selected window in space and time.

3. The method of claim 2, wherein the window captures only a single seismic reflection event, either a primary reflection or a multiple reflection.

4. The method of claim 3, wherein the single seismic reflection event is a first-in-time primary reflection or a first-in-time multiple reflection.

5. The method of claim 1, further comprising filtering the missing near-offset traces that are inverted from the reciprocity relationship to remove artifacts.

6. The method of claim 5, wherein the filter to remove artifacts is a curvelet transform or other directional transform.

7. The method of claim 5, wherein the filter to remove artifacts is a Fourier dip filter.

8. The method of claim 1, wherein the estimated missing near-offset traces are composed by using the synthetic seismic data for a selected shallow depth layer and using the iteratively inverted near-offset traces for greater depths.

9. The method of claim 8, wherein the shallow depth layer is selected by using a constraint indicating which part of the synthetic seismic data at the missing near offsets has more fidelity than the missing near-offset traces estimated by inverting the reciprocity relationship.

10. The method of claim 1, wherein the reciprocity relationship is a convolution-type reciprocity relationship.

11. The method of claim 10, wherein the measured seismic data are acquired in a seismic survey employing a line of receivers deployed beneath an air-ground or air-water interface, and wherein the convolution-type reciprocity relationship can be expressed in terms of a surface integral as follows:

$$P(a, b, \omega) - P_0(a, b, \omega) = \int_{\partial s} [P_0(x, b, \omega) \nabla P(x, b, \omega) - P(x, b, \omega) \nabla P_0(x, b, \omega)] \cdot n \, ds$$

where the surface integral is performed along a rectangular surface defined by a first segment of the line of receivers along which first segment data are recorded joined with a second segment of the line of receivers where near-offset data are missing, a line parallel to and directly above said first and second segments along the air-ground or air-water interface, and vertical lines connecting adjacent ends forming a rectangle.

12. The method of claim 1, wherein the measured seismic data are co-located pressure and velocity measurements.

13. The method of claim 1, wherein the iterative inverting is performed using a Landweber iteration method.

14. The method of claim 1, wherein the iterative inverting is controlled by an eigenvalue constraint.

15. The method of claim 1, further comprising applying SRME or another multiple-reflection elimination method to the measured seismic data with the estimated missing near-offset traces to attenuate multiple reflections in the measured seismic data and restore primary reflections to their true amplitudes.

16. The method of claim 15, further comprising interpreting the measured seismic data after multiple-reflection elimination for indication of hydrocarbon presence.

17. A method for production of hydrocarbons, comprising applying a method of claim 1 to measured seismic data to extrapolate missing near-offset seismic data, then applying a multiple-reflection elimination method to the measured seismic data with the extrapolated missing near-offset seismic data, then interpreting the measured seismic data after extrapolation and multiple-reflection elimination for indication of hydrocarbon presence, and in response to such an indication, drilling a well and producing hydrocarbons.

18. A computer program product, comprising a non-transitory computer usable medium having a computer readable program code embodied therein, said computer readable program code adapted to be executed to implement a method for estimating missing near-offset traces in measured seismic data, said method comprising relating all or part of synthetic seismic data, generated using a reference subsurface model, to the measured seismic data by a reciprocity relationship, and then iteratively inverting the reciprocity relationship for the missing near-offset traces; and wherein said computer readable program code is further adapted to use the estimated missing near-offset traces to augment the measured seismic data, then to apply a technique for removal of multiple reflections, and output seismic data ready for interpretation.

* * * * *